United States Patent
Dangel et al.

(10) Patent No.: US 8,873,919 B2
(45) Date of Patent: Oct. 28, 2014

(54) PARTICLE FILLED POLYMER WAVEGUIDE

(75) Inventors: Roger F. Dangel, Rueschlikon (CH); Thilo H. Stoeferle, Rueschlikon (CH); Jonas R. Weiss, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 13/312,570

(22) Filed: Dec. 6, 2011

(65) Prior Publication Data

US 2012/0155821 A1 Jun. 21, 2012

(30) Foreign Application Priority Data

Dec. 17, 2010 (EP) .................................... 10195641

(51) Int. Cl.
 *G02B 6/10* (2006.01)
 *G02B 6/122* (2006.01)
(52) U.S. Cl.
 CPC .................................... *G02B 6/1221* (2013.01)
 USPC ........................................................ 385/129
(58) Field of Classification Search
 None
 See application file for complete search history.

(56) References Cited

U.S. PATENT DOCUMENTS

| | | | | |
|---|---|---|---|---|
| 5,175,199 | A * | 12/1992 | Asano et al. | 523/444 |
| 6,246,123 | B1 * | 6/2001 | Landers et al. | 257/787 |
| 6,593,392 | B2 | 7/2003 | Wang | |
| 7,046,439 | B2 | 5/2006 | Kaminsky et al. | |
| 7,106,938 | B2 * | 9/2006 | Baek et al. | 385/131 |
| 7,306,845 | B2 | 12/2007 | Horne et al. | |
| 7,440,671 | B2 | 10/2008 | Sarukura et al. | |
| 7,469,083 | B2 | 12/2008 | Todori et al. | |
| 7,738,752 | B2 | 6/2010 | Yamagiwa et al. | |
| 2001/0019037 | A1 * | 9/2001 | Zakhidov et al. | 216/56 |
| 2005/0135118 | A1 * | 6/2005 | Takata | 362/615 |
| 2005/0203239 | A1 * | 9/2005 | Shibahara et al. | 524/494 |
| 2009/0203820 | A1 * | 8/2009 | Sawada et al. | 524/154 |

FOREIGN PATENT DOCUMENTS

| | | | |
|---|---|---|---|
| JP | 2001-272565 A | * | 10/2001 |
| JP | 2009-216919 A | * | 9/2009 |
| WO | 03070816 A1 | | 8/2003 |

OTHER PUBLICATIONS

R. Dekker et al., "Rare Earth Doped Nanoparticles in Organic and Inorganic Host Materials for Application in Integrated Optics," 2nd International Symposium on Science and Technology of Dielectrics in Emerging Technologies and Persistent Phosphors, May 15-20, 2005.

L.H. Slooff et al.,"Rare-Earth Doped Polymers for Planar Optical Amplifiers," Journal of Applied Physics; Applied Physics Reviews; vol. 91, No. 7; pp. 3955-3980; Apr. 2002.

Hsiang-Han Hsu & Takaaki Ishigure, "High-Density Channel Alignment of Graded Index Core Polymer Optical Waveguide and its Crosstalk Analysis with Ray Tracing Method," Optical Society of America; vol. 18, No. 13; Optics Express; 2010.

M.S. Iovu et al., "New As2S3:Pr3*—Polymer Composite Materials," Journal of Optoelectronics and Advanced Materials; vol. 8, No. 1, pp. 257-260; Feb. 2006.

Louay Eldada, "Polymer Microphotonics," Proceedings of SPIE vol. 5225 Nano- and Micro-Optics for Information Systems; pp. 49-60; SPIE 2003.

(Continued)

*Primary Examiner* — Mike Stahl
(74) *Attorney, Agent, or Firm* — Cantor Colburn LLP

(57) ABSTRACT

A polymer waveguide including a polymer matrix and particles, wherein the particles are embedded in the polymer matrix and have lower optical bulk losses than the polymer matrix.

17 Claims, 2 Drawing Sheets

(56) References Cited

OTHER PUBLICATIONS

Schott, [Online]; [retrieved on Aug. 12, 2011]; retrieved from the Internet http://www.us.schott.com/epackaging/english/overview/technologies/powder.html Schott North America, Inc. :Glass Made of Ideas, "Glass Powder Technology," Products and Applications; 2011.

Isabelle Ledoux-Rak et al., "Multifunctional Molecular Materials and Nanostructures for Photonics: From Molecular Engineering to Optoelectronic Devices," Proceedings of the Symposium on Photonics Technologies for 7th Framework Program; pp. 246-249; Oct. 2006.

SS Nano, [online]; [retrieved on Aug. 15, 2011]; retrieved from the Internet http://www.ssnano.com/home SkySpring Nanomaterials, Inc.; pp. 1-5; 2011.

Shuji Yamada et al., "Multi-Sized Sphere Packing," Jul. 2009.

* cited by examiner

PARTICLE FILLED POLYMER WAVEGUIDE

PRIORITY

This application claims priority to European Patent Application No. 10195641.5, filed 17 Dec. 2010, and all the benefits accruing therefrom under 35 U.S.C. §119, the contents of which in its entirety are herein incorporated by reference.

BACKGROUND

The disclosure relates to the field of polymer waveguides and, more particularly, to polymer waveguides having reduced propagation loss.

Polymer waveguides are an alternative to glass fibers for use in optical high performance data communication applications such as in supercomputers and datacenters. Polymer waveguides can be manufactured with known technologies, such as the so-called "planar technologies", on the panel level, possibly functionalized to include splitters, combiners, coupling elements, etc. They can support higher optical interconnect densities on the board level. Their cost is expected to become lower than that of glass fibers.

One of the main drawbacks of polymer waveguides is their propagation loss, which typically is on the order of 2-5 dB per meter, whereby typical link-lengths are limited to 1 meter or less. In comparison, typical loss values for multimode glass fibers are in the range of 0.0035 dB per meter.

It can be realized that the two main origins for the losses are: (1) induced by the manufacturing process (e.g., surface roughness, geometrical tolerances and contamination); and (2) due to the intrinsic loss of the polymers employed (e.g., different molecular and bond resonances).

BRIEF SUMMARY

According to a first aspect thereof, the present disclosure provides a polymer waveguide including a polymer matrix and particles, wherein the particles are embedded in the polymer matrix and have lower optical bulk losses than the polymer matrix.

In another embodiment, a method of fabricating of a polymer waveguide includes embedding particles within a polymer matrix, wherein the particles have lower optical bulk losses than the polymer matrix.

Methods and devices embodying the present disclosure will now be described, by way of non-limiting examples, and in reference to the accompanying drawings.

DETAILED DESCRIPTION

Disclosed herein are polymer waveguides, wherein particles are embedded in a polymer matrix. The particles have lower optical bulk losses than the polymer matrix, such as to alleviate the intrinsic loss problem of polymer materials usually employed in polymer waveguides. Some embodiments provide polymer waveguides having optical properties comparable to those of glass fibers, yet with advantages of polymer waveguides (e.g., low cost, low manufacturing temperatures, panel level and multi level manufacturing, functional structures like splitters and combiners, short turnaround times, etc.).

Figure 1:
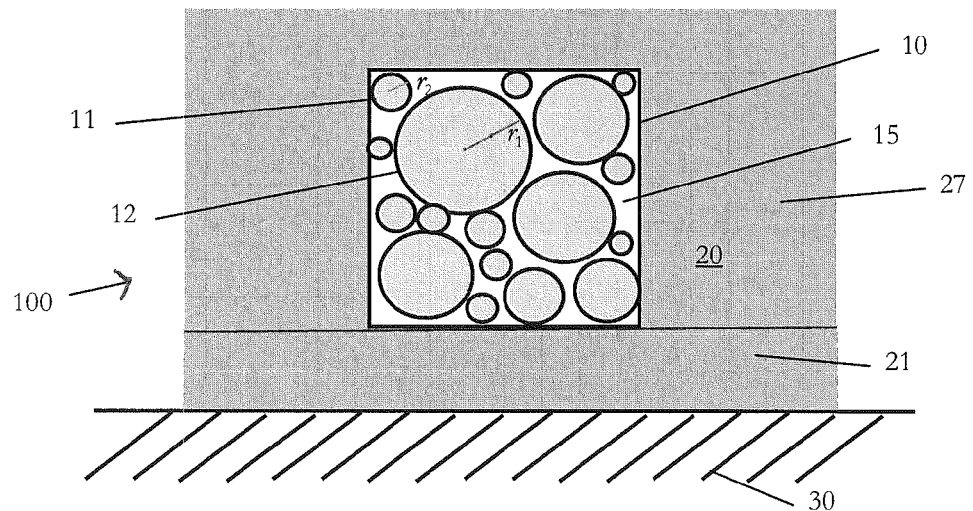
FIG. 1 schematically illustrates a section of a polymer waveguide according to embodiments of the disclosure.

FIG. 1 illustrates a section of a polymer waveguide 100 according to embodiments of the disclosure. As is shown, particles 11, 12 are embedded in a polymer matrix 15 of the polymer waveguide. The polymer matrix may be an optical grade polymer such as used for waveguide manufacturing. Since the particles have lower optical bulk losses, the light traveling within the particles will be attenuated less than within the polymer, resulting in a net reduction of the light attenuation of the waveguide.

In an exemplary embodiment, the refractive index of the particles substantially matches the refractive index of the polymer matrix, to minimize reflections at the particle grain-boundaries (e.g., especially when using glass particles). Examples are discussed below.

In the depicted embodiment, the particles are embedded in the core material 10 of the polymer waveguide. The core rests on a lower cladding 21, and is covered with an upper cladding 27, the exact configuration/manufacture of the cladding being unimportant in the most general cases. Reference numeral 20 generally denotes the cladding material and 30 denotes a carrier substrate.

It may be desirable for both the waveguide core and the cladding materials to be filled with particles. However, if the optical energy is sufficiently confined within the waveguide core, the (small) benefit of using particles in the cladding might not justify the additional processing effort required for embedding particles in the cladding. On the other hand, it is also contemplated that particles may be also embedded in the cladding material too (or in the cladding only), which already reduces the overall optical loss.

As indicated above, glass particles are desirable, as particles are known and commercially available, as e.g., in some of the references cited in the introduction. However, any other material providing reduced optical loss can be used.

Exemplary particle sizes may, for instance, be in the micrometer or nanometer range or, more specifically between 5 and 2500 nanometers. Exemplary polymer waveguide dimensions are 50 microns core-edge-length. Thus, particles will generally be (about) one order of magnitude smaller, in order to be easily processable. Obviously, particles would be smaller than 50 microns in that example. With regard to a lower end, although there is no limitation in principle, practical limitations of today's manufacturing processes are about 5 nanometers or above.

For instance, using particles with micrometer dimensions, the emulsion obtained by embedding particles in the polymer matrix shall likely behave like a viscous liquid and thus be more easily processed, i.e., similar to unloaded polymers, whereby compatibility with existing polymer processes can be maintained.

In variants, particles whose average diameter is between 25 nanometers and 200 nanometers, may be used, as is discussed later.

Still further, particles of different sizes and/or shapes are used, such as to optimize the particle fill factor (i.e., the volume fraction occupied by the particles in a given volume). This way, the volume fraction that can be achieved may exceed the typical value of 64%, as obtained with random packings of monodisperse spheres. It may be desirable to obtain volume fractions above 70%, e.g., 78% or more, as achievable with bidisperse random packings.

In fact, it may be desirable to optimize several parameters concurrently. For example, the volume fraction of the particles may be maximized while achieving a given viscosity for the emulsion, when manufacturing the polymer waveguide. Therefore, the particles are polydispersed in size and/or shape.

For instance, an essentially bidisperse packing of (spherical) particles, exhibiting essentially two characteristic radii $r_1$ and $r_2$, $r_1 > r_2$ may be used. The larger the ratio between $r_1$ and $r_2$ is, the higher density can be obtained (assuming e.g., a random packing). Then, assuming that $r_2$ is fixed, the larger radius $r_1$ can be optimized to achieve the highest possible density, e.g., according to the relation $$r_1 = c\sqrt{Vr_2/B},$$

where c is a constant which can be optimized depending on the actual geometry of the matrix, B is the surface area of the matrix and V is the volume of the matrix. For a long cylinder with a square section, c=2.14 is a convenient choice, see e.g., http://www2.latech.edu/~jkanno/packing.pdf (as retrieved from the Internet on Dec. 8, 2010). Note that such a relation allows to jointly optimize $r_1$ and $r_2$ to obtain e.g., an optimal viscosity vs. fill factor. More generally, the size distribution can be optimized with respect to manufacturability of the waveguide vs. optical properties.

Next, the scattering loss of the filling particles can be estimated based on the work of Slooff et al., J. Appl. Phys. 91, 3955 (2002). In particular, in the Rayleigh limit, where the (average) particle radius r is smaller than the wavelength, the scattering cross section of a particle with refractive index $n_p$ embedded in a matrix with refractive index $n_m$ is given by $$C_{sca} = \frac{8}{3}\left(\frac{2\pi n_p r}{\lambda}\right)^4 \left(\frac{\left(\frac{n_p}{n_m}\right)^2 - 1}{\left(\frac{n_p}{n_m}\right)^2 + 2}\right)^2 \pi r^2.$$

The total scattering coefficient is then given by $$a_{sca} = \frac{3\eta C_{sca}}{4\pi r^3},$$

where η is the fill fraction of the spherical particles in the polymer matrix.

Figure 2:
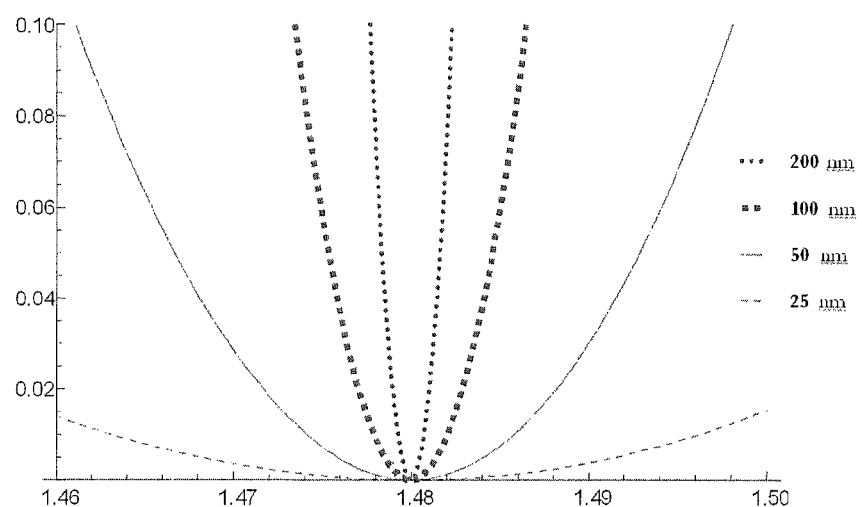
FIG. 2 is a graph representing the scattering loss of particles (to be embedded in a polymer matrix), versus the refractive index of the particles, according to embodiments.

FIG. 2 is a graph representing the scattering loss (vertical axis, in dB/cm) of monodisperse particles vs. the refractive index thereof (horizontal axis). The curves are calculated by assuming a fill factor of 74% for the particles and a refractive index of 1.48 for the polymer matrix. The resulting curves are essentially parabolic, centered on the polymer refractive index value. The larger the particle diameter, the tighter the parabola. Smaller particles are therefore desirable. All the more, this result shows that the refractive index of the particles is preferably carefully matched onto the polymers.

Figure 3:
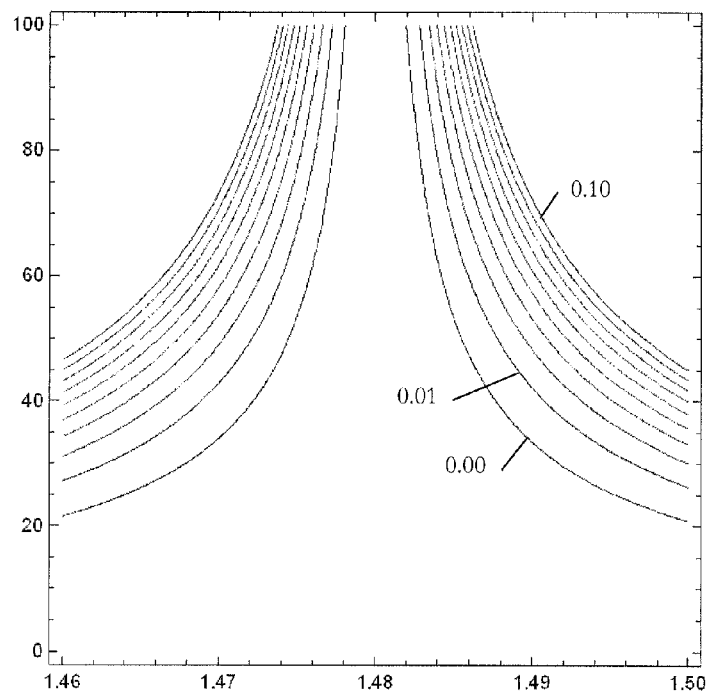
FIG. 3 is a graph representing contour lines of the scattering loss of particles, with respect to the particle size and the refractive index of the particles, according to embodiments.

FIG. 3 is a graph representing contour lines of the scattering loss of particles, with respect to the particle size (vertical axis, nanometers) and the refractive index of the particles (horizontal axis), in embodiments. Contours are separated by 0.01 dB/cm. Yet, contours above 0.1 dB/cm are not rendered, for clarity. The obtained contours show that the smaller the particles are, the larger refractive index mismatch is affordable. Thus, more generally, the refractive index mismatch is defined by the particle sizes, e.g., the polymer matrix is chosen according to the average particle size.

In this respect, a refractive index of the polymer matrix that matches a refractive index of the particles within p % (typically p=1 or 0.1) may be obtained. The optimal value actually depends on the particle size, as seen above. The following values may be used:

p=1.0 and typical particle sizes less than s=25 nanometers, or p=0.1 and s=120 nanometers, which in both cases results in 0.01 dB/cm scattering loss for the polymer waveguide (assuming a fill factor of 74%, it being noted that the intrinsic absorption by the particle is generally orders of magnitudes less); or p=0.1 and s=25, which lowers the loss to 0.0001 dB/cm.

Accordingly, in embodiments, particle sizes of less than 200 nanometers, preferably less than 25 nanometers are desirable. Note that whether spherical or arbitrary shape particles are used is yet of little importance in comparison to how the matching of refractive indices. Yet, for simplicity, spherical particles are mostly assumed in the present description.

Of course, other convenient sizes vs. mismatch values can be derived, following the same reasoning as described above in reference to FIGS. 2 and 3, and depending on the maximal loss desired.

As described above, the intrinsic loss of the particles can be less than $10^{-4}$ dB/cm. This can, for instance, be obtained by ultrafine contamination free grinding of optical fiber-grade raw material, see e.g., Slooff et al., J. Appl. Phys. 91, 3955 (2002).

Also, the polymer matrix may include a mixture of different polymers and/or electron-rich organic dopants can be added to match the refractive indices (also over temperature).

Figure 4:
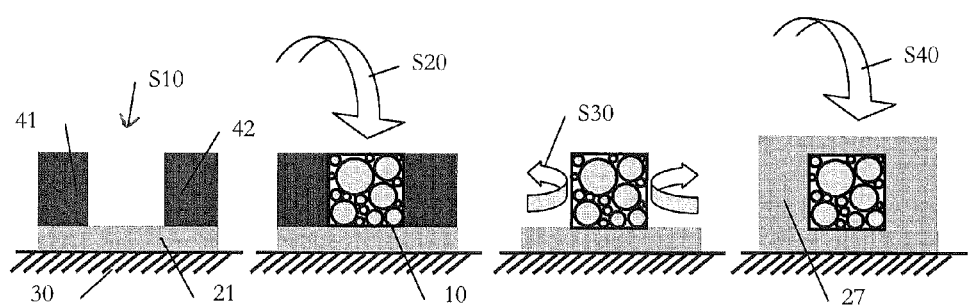
FIG. 4 depicts steps of a method of fabrication of a polymer waveguide, according to embodiments.

Next, FIG. 4 depicts a method of fabrication of a polymer waveguide, according to embodiments. As seen above, some embodiments of polymer waveguides are compatible with classical polymer processes, such that various fabrication methods can be contemplated for the present waveguides. A fabrication method wherein the polymer matrix is selected according to the average particle size (or reciprocally), in order to minimize the refractive index mismatch, may be used.

Photoactive structuring of the particle filled polymer (e.g., direct laser writing or mask exposing the core layer) might not be an optimal strategy to achieve low surface roughness independently from the particles used. Therefore, a "mold like" approach such as depicted in FIG. 4 may be used. Most generally, such an approach consists of molding a polymer matrix material 10 with particles 11, 12 embedded therein.

In further detail the method may include providing a mold structure 21, 41, 42 is provided, as shown at S10. The mold structure may, for instance, include a lower cladding 21, and lateral polymer resist layers 41, 42. Next, at S20, a core material 10 is deposited in the mold structure, e.g., as an emulsion or suspension (particles are already embedded in the matrix at this stage), where it can be further processed (e.g., UV curing the matrix). Subsequently, at S30, at least part of the mold structure may (or may not) be removed, e.g., the lateral resists are stripped, such as to uncover the deposited core 10. Yet, if the cladding material is used as the mold, it may remain in place and not be removed. Finally, at S40, the core material can be covered with the cladding material 27. It may, for example, be polymerized. Note that the cladding material could include optical particles embedded therein.

Beyond the better wall roughness, this approach broadens the selection of usable core materials, as photo-structurability is no longer required. Incidentally, relatively pure, i.e., defectfree fill particles (e.g., having low gas/particle/dopant contamination) would likely be used. Finally, for flexible circuit applications, the present approach has advantages with respect to using bulk glass waveguides through increased flexibility and thus potentially tighter bend radii.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims. For example, other materials than those described above may be convenient.

What is claimed is:

1. A polymer waveguide comprising a polymer matrix and particles, wherein the particles are embedded in the polymer matrix and have lower optical bulk losses than the polymer matrix, and wherein the particles are embedded both in a core material and in a cladding material of the polymer waveguide.

2. The polymer waveguide of claim 1, wherein the particles comprise one or more of micrometer and nanometer particles having an average diameter between 5 nanometers and 200 nanometers.

3. The polymer waveguide of claim 1, wherein the particles comprise one or more of micrometer and nanometer particles having an average diameter between 25 nanometers and 200 nanometers.

4. The polymer waveguide of claim 1, wherein a refractive index of the particles substantially matches a refractive index of the polymer matrix.

5. The polymer waveguide of claim 1, wherein the particles are glass particles.

6. The polymer waveguide of claim 1, wherein a volume fraction of the particles is more than 64%.

7. The polymer waveguide of claim 1, wherein a volume fraction of the particles is more than 70%.

8. A polymer waveguide comprising a polymer matrix and particles, wherein the particles are embedded in the polymer matrix and have lower optical bulk losses than the polymer matrix, wherein the particles are polydispersed in size and/or shape, and are arranged as a bidisperse packing.

9. The polymer waveguide of claim 1, wherein an intrinsic optical material loss of the particles is less than $10^{-4}$ dB/cm.

10. The polymer waveguide of claim 1, wherein the polymer matrix comprises one or more of:
a plurality of polymer materials; and
additional electron-rich organic dopants.

11. The polymer waveguide of claim 1, wherein a refractive index of the polymer matrix matches a refractive index of the particles within 1.0%.

12. The polymer waveguide of claim 1, wherein a refractive index of the polymer matrix matches a refractive index of the particles within 0.1%.

13. A method of fabricating of a polymer waveguide, the method comprising:
embedding particles within a polymer matrix, wherein the particles have lower optical bulk losses than the polymer matrix, wherein the particles are embedded both in a core material and in a cladding material of the polymer waveguide.

14. The method of claim 13, further comprising one of:
selecting the polymer matrix according to sizes of the particles, prior to fabricating the polymer waveguide; and
selecting sizes of the particles according to the polymer matrix, prior to fabricating the polymer waveguide.

15. The method of claim 14, further comprising molding a material of the polymer waveguide with the particles embedded therein.

16. A method of fabricating of a polymer waveguide, the method comprising:
embedding particles within a polymer matrix, wherein the particles have lower optical bulk losses than the polymer matrix;
performing one of: selecting the polymer matrix according to sizes of the particles, prior to fabricating the polymer waveguide, and selecting sizes of the particles according to the polymer matrix, prior to fabricating the polymer waveguide; and
molding a material of the polymer waveguide with the particles embedded therein, wherein the molding comprises:
providing a mold structure;
depositing a core material of the polymer waveguide with the particles embedded therein in the mold structure provided; and
covering the at least parts of the deposited core material with a cladding material.

17. The method of claim 16, wherein the molding further comprises removing at least part of the mold structure such as to uncover at least parts of the deposited core material.

* * * * *